United States Patent
Parke

(10) Patent No.: US 10,600,533 B2
(45) Date of Patent: Mar. 24, 2020

(54) MULTI-MEMBER CABLE WITH IMPROVED MID-SPAN ACCESS

(71) Applicant: CommScope, Inc. of North Carolina, Hickory, NC (US)

(72) Inventor: Daniel J. Parke, Hickory, NC (US)

(73) Assignee: CommScope, Inc. of North Carolina, Hickory, NC (US)

(*) Notice: Subject to any disclaimer, the term of this patent is extended or adjusted under 35 U.S.C. 154(b) by 0 days.

(21) Appl. No.: 15/458,008

(22) Filed: Mar. 13, 2017

(65) Prior Publication Data

US 2017/0271046 A1 Sep. 21, 2017

Related U.S. Application Data

(60) Provisional application No. 62/308,790, filed on Mar. 15, 2016.

(51) Int. Cl.
*H01B 7/17* (2006.01)
*H01B 7/36* (2006.01)
(Continued)

(52) U.S. Cl.
CPC .............. *H01B 7/17* (2013.01); *G02B 6/449* (2013.01); *G02B 6/4482* (2013.01);
(Continued)

(58) Field of Classification Search
CPC .... G02B 6/4482; G02B 6/449; G02B 6/4495; G02B 6/4413; G02B 6/4434;
(Continued)

(56) References Cited

U.S. PATENT DOCUMENTS 3,775,549 A * 11/1973 Matsuda ................ H01B 3/485
174/25 R
5,008,056 A * 4/1991 Kurtz ................... B29C 47/0883
264/130
(Continued)

FOREIGN PATENT DOCUMENTS

DE 3637205 A1 5/1988
EP 1168023 A2 1/2002
(Continued)

*Primary Examiner* — Timothy J Thompson
*Assistant Examiner* — Guillermo J Egoavil
(74) *Attorney, Agent, or Firm* — Muncy, Geissler, Olds & Lowe, P.C.

(57) ABSTRACT

A multi-member cable includes at least a first cable element and a second cable element. The first and second cable elements twist around a center axis of the cable in a counterclockwise direction multiple times to a first reversal point, then twist about the center axis of the cable in a clockwise direction multiple times until a second reversal point, with this pattern repeating along a length of the cable. Adhesion points are formed at intervals along a length of the cable to connect the first and second cable elements. The adhesion points may be spaced apart at an interval equal to a distance between the first and second reversal points. An outer surface of a jacket of the cable may include indications at the first and/or second reversal points, such as physical bumps or markings.

9 Claims, 11 Drawing Sheets

(51) Int. Cl.
  *H01B 9/00* (2006.01)
  *G02B 6/44* (2006.01)

(52) U.S. Cl.
  CPC ........... *G02B 6/4495* (2013.01); *H01B 7/365* (2013.01); *H01B 9/006* (2013.01); *G02B 6/4413* (2013.01); *G02B 6/4434* (2013.01)

(58) Field of Classification Search
  CPC .. G02B 6/4405; G02B 6/4407; G02B 6/4483; G02B 6/4486; G02B 6/443; H01B 7/17; H01B 7/36; H01B 7/365; H01B 9/00; H01B 9/006
  USPC ...................... 174/113 C; 385/100, 104, 103
  See application file for complete search history.

(56) References Cited

U.S. PATENT DOCUMENTS

| | | | |
|---|---|---|---|
| 5,268,971 A | 12/1993 | Nilsson et al. | |
| 5,729,966 A * | 3/1998 | Grulick | G02B 6/4482 385/147 |
| 5,809,194 A * | 9/1998 | Lovie | G02B 6/4407 347/4 |
| 5,905,834 A | 5/1999 | Anderson et al. | |
| 7,049,523 B2 | 5/2006 | Shuman et al. | |
| 7,259,332 B2 | 8/2007 | Shuman et al. | |
| 8,855,454 B2 | 10/2014 | Quinn et al. | |
| 8,909,014 B2 | 12/2014 | Gimblet et al. | |
| 8,913,862 B1 * | 12/2014 | Emmerich | G02B 6/4433 385/103 |
| 2005/0286843 A1 * | 12/2005 | Dallas | G02B 6/4434 385/109 |
| 2006/0140557 A1 * | 6/2006 | Parris | G02B 6/4429 385/113 |
| 2008/0271919 A1 | 11/2008 | Elko | |
| 2012/0048591 A1 * | 3/2012 | Gareis | H01B 7/0823 174/102 R |
| 2013/0058614 A1 * | 3/2013 | Gimblet | G02B 6/4405 385/104 |
| 2015/0355430 A1 * | 12/2015 | Clampitt | G02B 6/4432 385/103 |
| 2016/0356974 A1 * | 12/2016 | Bringuier | G02B 6/4405 |
| 2017/0131499 A1 * | 5/2017 | Wunsch | G02B 6/4413 |
| 2017/0343753 A1 * | 11/2017 | Bauco | B29D 11/00663 |

FOREIGN PATENT DOCUMENTS

| | | |
|---|---|---|
| EP | 2977804 A1 | 1/2016 |
| JP | 11031418 A * | 2/1999 |
| WO | WO 2004/021367 | 3/2004 |
| WO | WO 2011139948 A1 | 11/2011 |
| WO | WO 2016196419 A1 | 12/2016 |

* cited by examiner

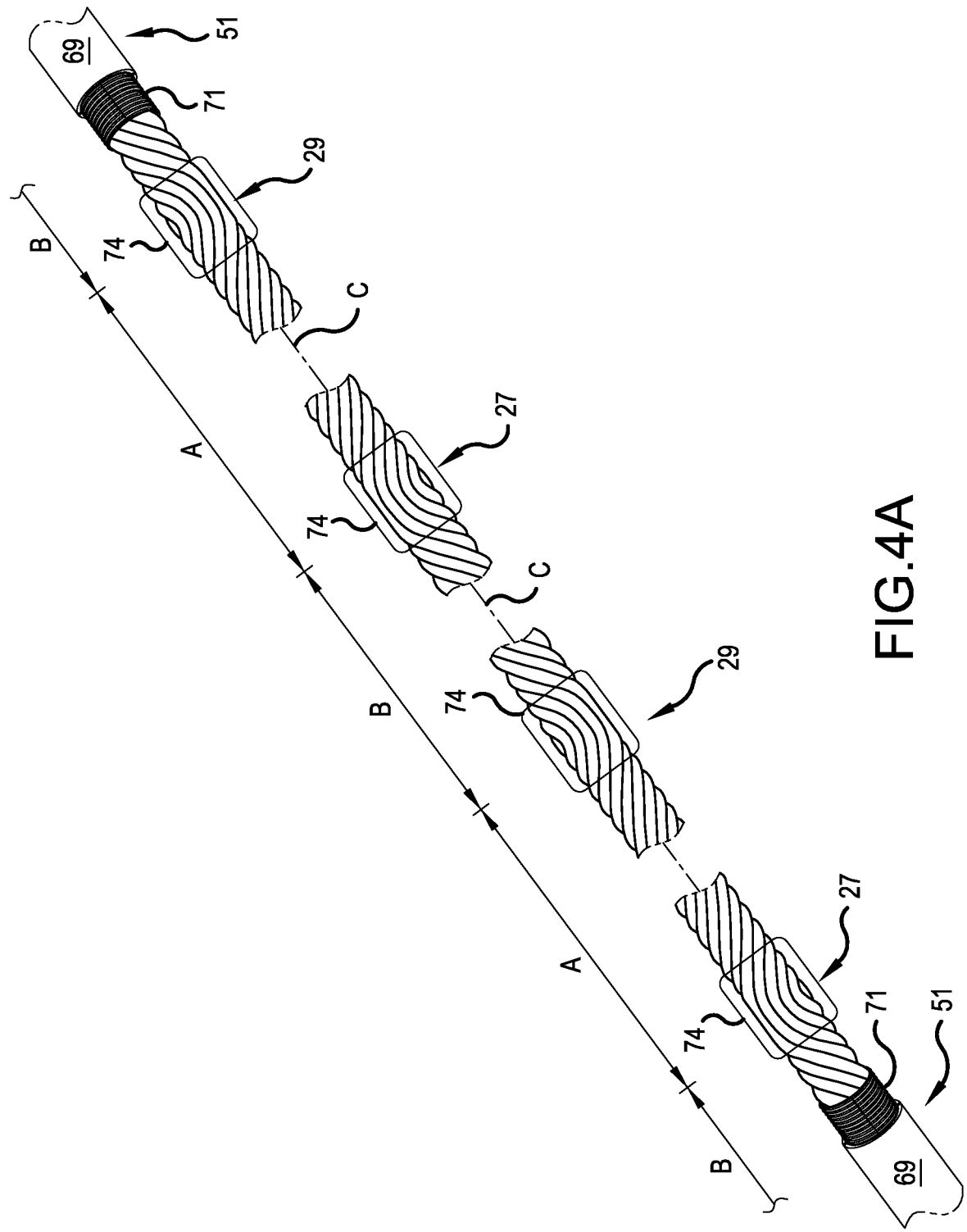

MULTI-MEMBER CABLE WITH IMPROVED MID-SPAN ACCESS

This application claims the benefit of U.S. Provisional Application No. 62/308,790, filed Mar. 15, 2016, which is herein incorporated by reference.

BACKGROUND OF THE INVENTION

1. Field of the Invention

The present invention relates to a jacketed, multi-member cable. More particularly, the present invention relates to a multi-member cable with a strand lay of the cable elements that switches directions along the length of the cable, wherein the cable has features for improved mid-span access and cost savings in manufacturing.

2. Description of the Related Art

A multi-member cable 9, having many buffer tubes 17 and/or power conductors 21 bundled together, is known in the existing arts. FIG. 1 is a perspective view of a typical multi-member cable 9 having a six-around-one configuration, wherein six buffer tubes 17 and/or power conductors 21 are located around a central strength member 25. In FIG. 1, reference numeral 11 denotes an outer jacket. The outer jacket 11 surrounds an armor layer 13. The armor layer 13 surrounds a cable core 15.

In practice, the cable core 15 is made up of separate cabling elements, such as one or more buffer tubes 17 with loose fibers 19 and/or one or more insulated power conductors 21 with central conductors 23. FIG. 1 shows a six-around-one configuration, or more precisely six cable elements around the central strength member 25. The strength member 25 may be formed as a glass-reinforced plastic (GRP) rod or a fiber-reinforced plastic (FRP) rod. First and second binding tapes 35 and 37 wrap around the cable core 15. Commonly, the first and second binding tapes 35 and 37 are made of flat, polyester tape.

During the manufacturing process of the multi-member cable 9, the stranding of the cable core 15 changes directions, from clockwise to counterclockwise in a repeating pattern. The direction change point in the stranding is often called a switchback, or strand lay reversal point. Because the cable core 15 has switchbacks, the first and second binding tapes 35 and 37 are needed to hold the cable core 15 together during the manufacturing process, e.g., before the armor layer 13 is applied, and/or before the outer jacket 11 is extruded onto the cable core 15.

FIG. 2 is a perspective view of a long length of the multi-member cable 9 with the outer jacket 11 removed to show the inner stranding. A first switchback 27 shows a transition of the strand lay to a clockwise direction (as viewed from the left side of the FIG. 2 to the right side of FIG. 2). A second switchback 29 shows a transition of the strand lay to a counterclockwise direction. A distance A exists between the first switchback 27 and the second switchback 29. The distance A is typically related to the diameter of the multi-member cable 9, e.g., the number of cable elements which make up the cable core 15, and/or the size of the cable elements. Typical diameter ranges are 300 mm to 1,500 mm, such as 400 mm to 1,300 mm.

A third switchback 31 shows a transition of the strand lay from the counterclockwise direction back to the clockwise direction. A distance B exists between the second switchback 29 and the third switchback 31. The distance B is equally to the distance A. The pattern of strand lay reversals continues along the length of the multi-member cable 9. For example, a fourth switchback 33 transitions the strand lay from clockwise to counterclockwise, and so on.

During the manufacturing process of the multi-member cable 9, the stranding of the cable core 15 needs to held together prior to the jacketing process. If the cable core 15 is not held together, the cable elements will separate at the switchbacks 27, 29, 31, 33, etc. One or more binding cords or tapes, such as the first and second binding tapes 35 and 37, are wrapped around the cable core 15, as the cable core 15 is stranded to keep the cable core 15 intact. The intact cable core 15 is fed into a machine to apply the armor layer 13 and/or into a machine to extrude the outer jacket 11 over the cable core 15.

Additional background art can be seen in U.S. Pat. Nos. 5,268,971; 5,905,834; 7,049,523; 7,259,332; 8,855,454 and 8,909,014 and in U.S. Published Application No. 2008/0271919, each of which is herein incorporated by reference.

SUMMARY OF THE INVENTION

The Applicant has appreciated that cable designs, as shown in FIGS. 1 and 2, suffer one or more disadvantages. It is an object of this invention to address one or more the disadvantages of the cable designs of FIGS. 1 and 2.

One of the reasons that the switchbacks 27, 29, 31 and 33 occur in the core stranding is to provide for mid-span access to the cable elements. Mid-span access refers to a termination technique wherein one or more communication channels and/or power channels of a multi-member cable are accessed at some point between the first and second opposing ends of the multi-member cable. For example, a multi-member cable might extend from a head office to a remote cabinet at the back of a large subdivision of homes. The bundle of cables might pass through a smaller cabinet or enclosure near the front of the subdivision. Inside the smaller enclosure, one or more of the fibers 19 of one or more of the buffer tubes 17 could be accessed and terminated and/or tapped via a splicing operation. In either case, the remaining fibers 19 and power conductors 21 proceed uninterrupted to the remote cabinet at the back of the subdivision.

The switchbacks 27, 29, 31 and 33 allow the bundled cable elements to be spread apart from each other, after a section of the outer jacket 11 and/or the armor layer 13 is removed. Spreading the cable elements apart, greatly facilitates the termination and/or splicing operations.

One method of mid-span access is detailed in an online tutorial video published by Corning Inc. of Corning, N.Y. and may be found at: https://www.youtube.com/watch?v=yfMCUKMLD3o. In the video, a technician shows a multi-member cable including plural tubes with loose fibers, e.g. 96 fibers in total. To access a middle section of the multi-member cable, the technician uses a hook blade or rotary cable splitter to make a first ring cut partially through the outer jacket 11. The technician measures ten inches away and makes a second ring cut partially through the outer jacket 11.

Then, the cable is flexed several times at the first and second ring cut locations until the jacket breaks completely through. The hook blade is used to cut a path, ten inches long, through the outer jacket 11 from the first ring cut to the second ring cut. The section of the outer jacket 11 is then peeled off and discarded. Once the outer jacket is removed, any water blocking tape and/or armor layer 13 is removed.

With the cable core 15 exposed, the core stranding is inspected for a switchback. At point 2:56 (two minutes and fifty six seconds in the video's length of seven minutes and twenty-nine seconds), the technician states "I was lucky," as his cut out section of outer jacket 11 revealed a switchback. If no switchback was revealed in the ten inch section, the technician states that a further or third ring cut would be needed and a second outer jacket section would need to be removed. Switchbacks can occur in some multi-member cables 19 at intervals exceeding twenty inches. Therefore, one might potentially even have to make a fourth ring cut and remove a third jacket section before discovering a switchback in the cable core stranding.

Once the switchback is found, the technician measures a set distance to each side of the switchback and makes ring cuts on the outer jacket 11 at those points and removes the outer jacket 11 an equal distances on either side of the switchback. The equal distance length is determined by the enclosure into which the mid-span access will be housed for its termination and/or splice operations. In the video, the length for the selected enclosure is fifty-nine inches.

At point 4:45 in the video, the technician uses a ripper or scissors to make multiple cuts to the binding tapes 35 and 37 at several locations along the length of the exposed cable core 15. Then, the binding tapes 35 and 37 are removed and discarded.

Finally, the elements of the cable core 15, e.g., buffer tubes 17, are spread apart and the center strength member 25 is cut proximate the exit of the strength member 25 at each end of the remaining outer jacket 11. One or more of the buffer tubes 17 are opened to access the fibers 19 therein. The fibers 19 may be spliced or terminated, as needed. Then, the portion of the multi-member cable 9 with the outer jacket 11 removed is moved into the interior of the small enclosure for secure and protected storage.

The Applicant has appreciated that each cut made by the technician during a mid-span access process subjects the technician to potential injury, subjects the internal cable elements to potential damage, and takes up the technician's processing time. It is an object of the present invention to eliminate one or more of the cutting processes required by a mid-span access procedure.

Further, the Applicant has appreciated a cable design which can eliminate one or more of the component parts of the background cables, such as those shown in FIGS. 1 and 2. The elimination of a component part may lead to one or more of the following advantages over the background cables of FIGS. 1 and 2: A lower cost to produce the multi-member cable, quicker production per linear foot, reduced cable weight per linear foot, smaller cable profile/diameter (which can be important for an increase in density of multiple adjacent cable runs, lower wind resistance in tower installations, and easier conduit installation), and/or improved cable flexibility.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 4A is a perspective view of the multi-member cable of FIG. 3, with a large section of the outer jacket removed to show the core strand reversal points, covered by intermittently placed outer wraps;

DETAILED DESCRIPTION OF EMBODIMENTS OF THE INVENTION

Figure 1:
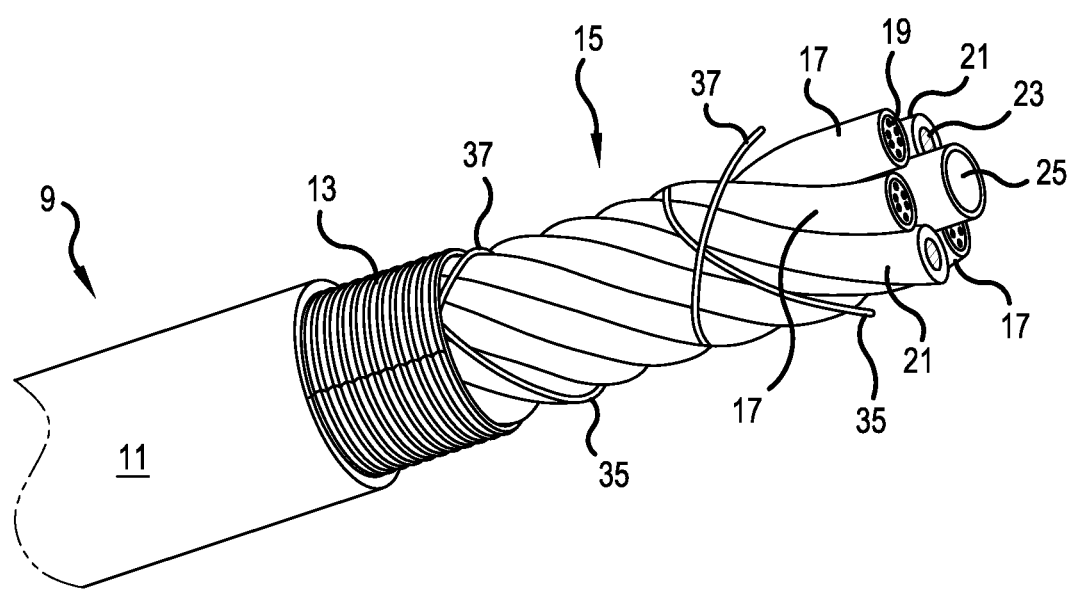
FIG. 1 is a perspective view of a multi-member cable end with a portion of an outer jacket and an armor layer removed to show the elements of the cable core, in accordance with the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 3:
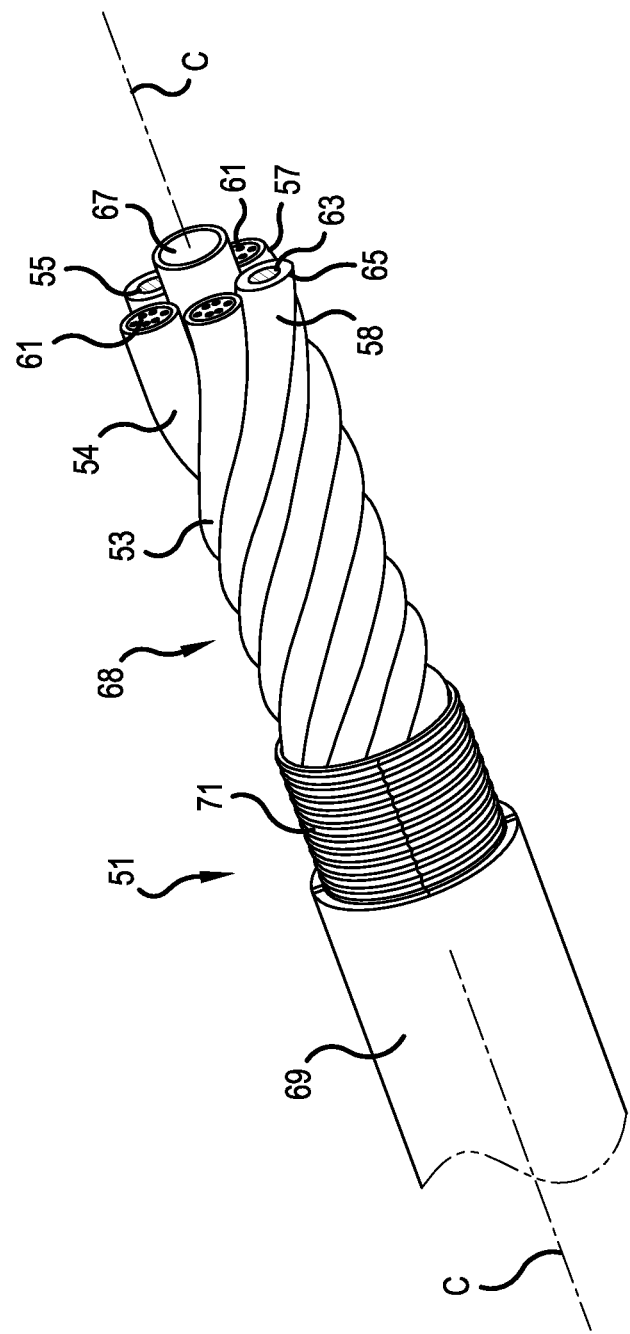
FIG. 3 is a perspective view of a multi-member cable end with a portion of an outer jacket and an armor layer removed to show the elements of the cable core, in accordance with the present invention.

FIG. 3 is a perspective view of a multi-member cable 51 having a six-around-one configuration, in accordance with the present invention. The multi-member cable 51 includes first, second, third, fourth, fifth and sixth cable elements 53, 54, 55, 56, 57 and 58. The first, second, fourth and fifth cable elements 53, 54, 56 and 57 are buffer tubes, each with one or more optical fibers 61 therein, e.g., two, four, six or more optic fibers 61 of the single mode or multimode type for transmitting light signals to form communications channels. If plural optical fibers 61 are disposed within a buffer tube, the optical fibers 61 may be loosely held in the buffer tube, or may be attached to each other, e.g., formed as one or more ribbons, within the buffer tube. If a single optical fiber 61 is disposed within the buffer tube, the optical fiber 61 may be tightly buffered, e.g., not loosely held in the buffer tube.

The third and sixth cable elements 55 and 58 are insulated conductors. For example, the third and sixth cable elements 55 and 58 may be 14 gauge conductors 63 surrounded by an insulation layer 65. The conductors 63 may be solid or stranded, and may be of smaller or larger sizes, e.g., 16 gauge, 12 gauge. The conductors 63 may be formed of copper, copper-clad-steel, aluminum or any other metal or alloy with good electrical conductivity. In practice, the cable elements may also include other power and/or communication mediums, such as a coaxial power conductor, or a twisted pair within a buffer tube, or as an independent cable element.

In FIG. 3, the first, second, third, fourth, fifth and sixth cable elements 53, 54, 55, 56, 57 and 58 surround a central strength member 67. The central strength member 67 may be formed as a glass-reinforced plastic (GRP) rod or a fiber-reinforced plastic (FRP) rod. Finally, an outer jacket 69 surrounds an armor layer 71. The armor layer 71 surrounds a cable core 68, i.e., the six-around-one formation of the first, second, third, fourth, fifth and sixth cable elements 53, 54, 55, 56, 57 and 58 and the central strength member 67.

The cable core 68 may also be configured with more or less cable elements, such as a five-around-one cable core (five cable elements around a central strength member 67), eight-around-one, ten-around-one or twelve-around-one. Also, the cable elements may have more than one orbit around the central strength member 67. For example, twelve-around-six-around-one (twelve cable elements around six cable elements around a central strength member 67) or fifteen-around-nine-around-one.

The outer diameter of the outer jacket 69 depends upon the cable core configuration and the size of the cable elements and the central strength member 67. Typical diameters range from 8 mm to 33 mm, such as 29 mm or 30 mm.

The multi-member cable 51 may optionally include additional elements like a water-blocking tape, water blocking gels inside and/or between the buffer tubes, rip cords, toning signal wires, drain/grounding wires, etc. Absent in FIG. 3 are the first and second binding tapes 35 and 37 surrounding the cable core 15 of the prior art cable of FIG. 1.

Figure 4:
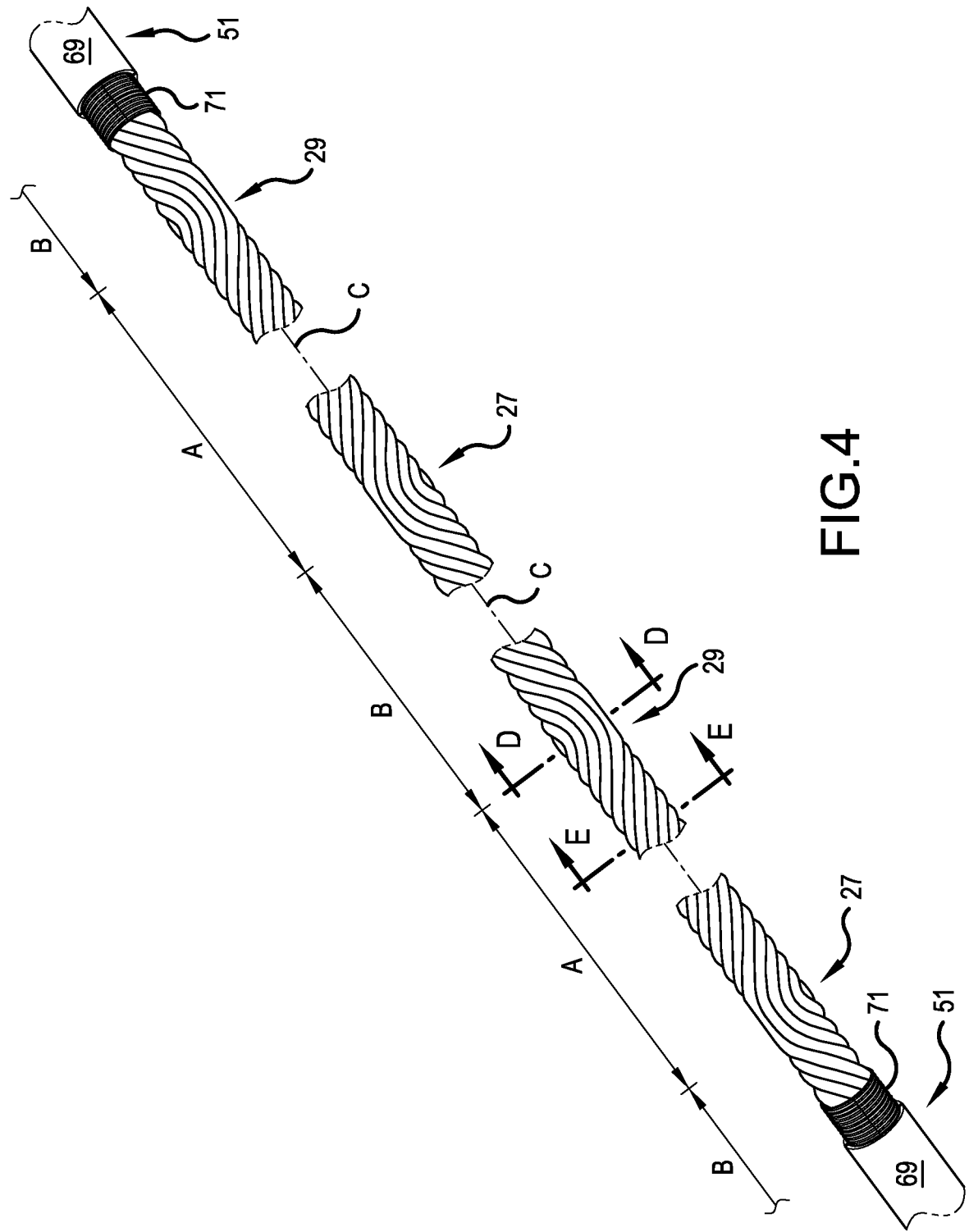
FIG. 4 is a perspective view of the multi-member cable of FIG. 3, with a large section of the outer jacket removed to show the core strand reversal points.

As best seen in FIG. 4, the first, second, third, fourth, fifth and sixth cable elements 53, 54, 55, 56, 57 and 58 twist around a center axis C of the multi-member cable 51 three hundred sixty degrees in a counterclockwise direction multiple times to a first reversal point 27. Then, the cable elements twist about the center axis C of the multi-member cable 51 three hundred sixty degrees in a clockwise direction multiple times until a second reversal point 29. The cable elements repeat a pattern of counterclockwise and clockwise twists about the center axis C of the multi-member cable 51 between multiple first and second reversal points 27 and 29 along a length of the multi-member cable 51 to create a strand lay which repeats direction reversals along the length of the multi-member cable 51.

The number of turns between the first and second reversal points 27 and 29 depends upon the cable core configuration and dimension of the cable core elements and the central strength member 67. For example, five and half turns to six turns might be feasible for the multi-member cable 51 of FIG. 3 with a six-around-one cable core configuration. However, more or fewer turns than 5.5 to 6 between reversal points should be considered to be within the purview of the present invention, such as four turns or seven turns or eight turns. The distance between the first reversal point 27 and the second reversal point 29 is between about 300 mm for smaller cables to about 1,500 mm for larger cables. For example, the distance between reversal points 27 and 29 for a small cable might be about 430 mm to about 500 mm, whereas the distance between reversal points 27 and 29 for a larger cable might be between about 1,200 mm and 1,400 mm. Typically, the distance A of clockwise rotation of the cable core 68 between the first reversal point 27 and the second reversal point 29 is equal to the distance B of counterclockwise rotation of the cable core 68 between the second reversal point 29 and the next, downstream first reversal point 27. However, it is not necessary to the invention that the distance A equal the distance B.

Figure 2:
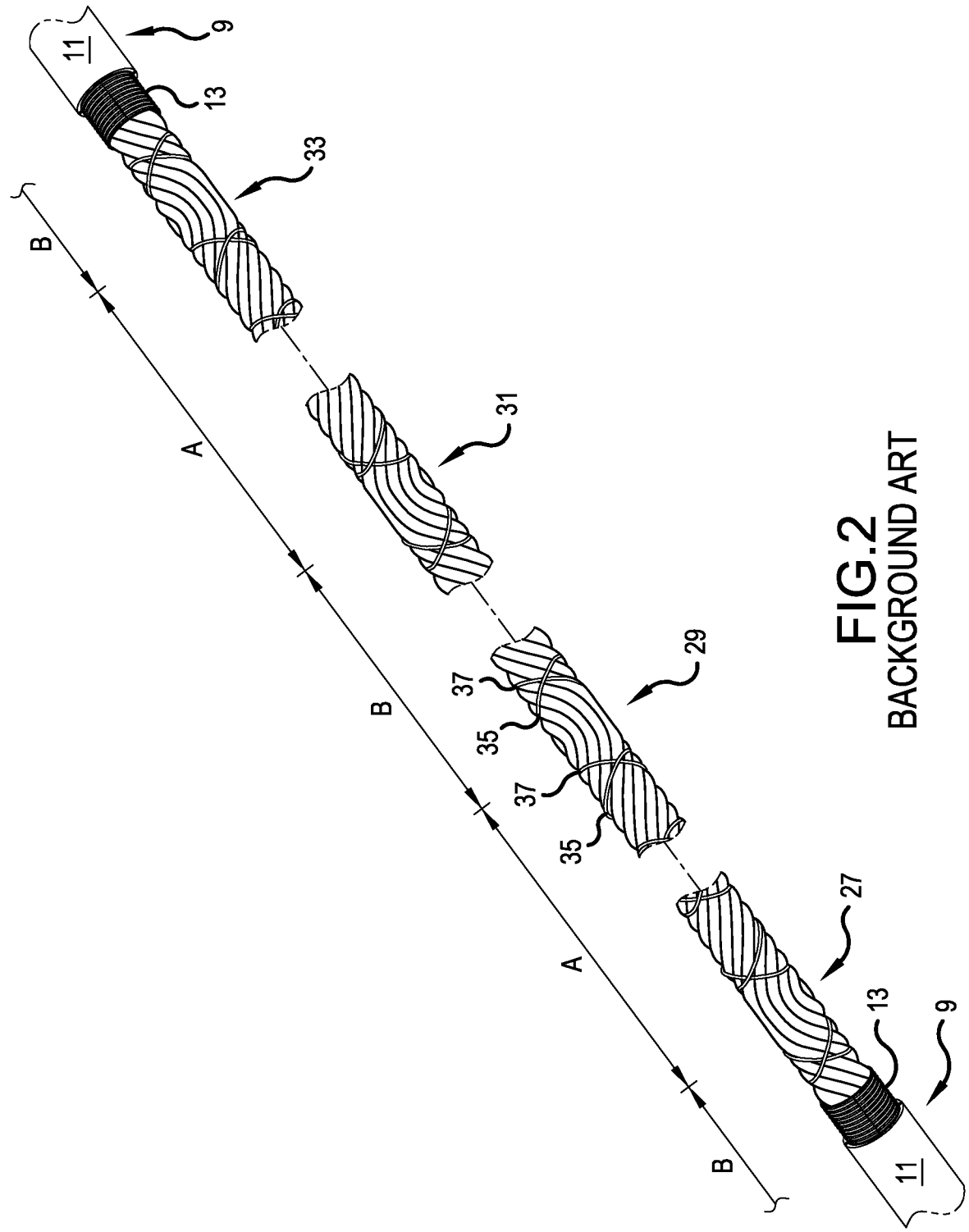
FIG. 2 is a perspective view of the multi-member cable of FIG. 1, with a large section of the outer jacket removed to show the core strand reversal points.

As previously noted, the multi-member cable 51 of the present invention does not include any binding tapes to hold the cable core 68 together (like the binding tapes 35 and 37 in FIGS. 1 and 2). Typically, one would expect binding tapes to be necessary, as the cable core will unwrap or unravel at the first and second reversal points 27 and 29 during the manufacturing process. The binding tapes are typically viewed to be needed to hold the cable core 68 together until the outer jacket 69 is extruded over the cable core (and/or until the water tapes or armor layer 71 are applied).

In a first embodiment of the present invention, the cable core 68 is held together during the manufacturing process by an adhesion force. In the first embodiment, the adhesion exists along the entire length of the cable core 68. For example, FIG. 5 may be considered a cross sectional view taken along lines D-D and E-E in FIG. 4.

Figure 5:
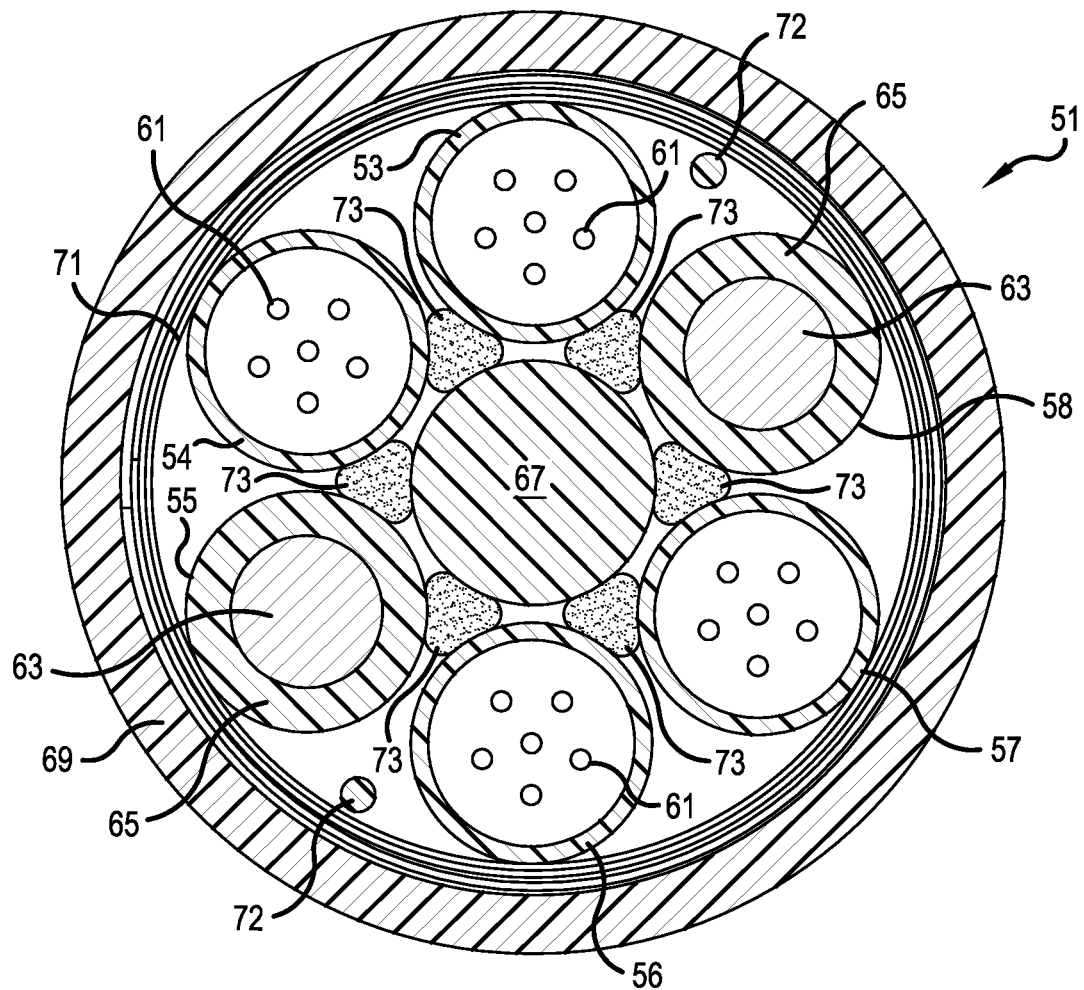
FIG. 5 is a first cross sectional view of the multi-member cable.

In FIG. 5, the first, second, third, fourth, fifth and sixth cable elements 53, 54, 55, 56, 57 and 58, as well as the central strength member 67, are shown in cross section. Two ripcords 72 are also shown in cross section, and are optionally included within the multi-member cable 51. The cable core 68 also includes adhesive strips 73, which are located between the central strength member 67 and each of the first, second, third, fourth, fifth and sixth cable elements 53, 54, 55, 56, 57 and 58. The adhesive strips 73 may be fed into the cable core 68 along with the cable elements 53, 54, 55, 56, 57 and 58 and the central strength member 67 and may create an adherence during the stranding process due to the forces applied as a result of the twisting operation. In other words, the adhesive strips 73 may be pressure activated. Alternatively, the adhesive strips 73 may be activated by light, like UV light (similar to a UV curable epoxy), and a light source may be provided in the manufacturing stream. Alternatively, the adhesive strips 73 may be activated by water or some other liquid or chemical, and a liquid bath and/or a sprayer/applicator may be employed in the stream of manufacturing to trigger the adhesive properties of the adhesive strips.

More information about adding an adhesive strip into a cable core can be found in U.S. Pat. No. 7,259,332, which is herein incorporated by reference. U.S. Pat. No. 7,259,332 describes a multi-member cable with no outer jacket. Instead of an outer jacket, the members of the cable core are held together by one or more adhesive members.

In a second, more preferred, embodiment, the adhesion exists intermittently along the entire length of the cable core. For example, FIG. 5 may be considered a cross sectional view taken along line D-D in FIG. 4, and FIG. 6 may be considered a cross sectional view taken along line E-E in FIG. 4.

Figure 6:
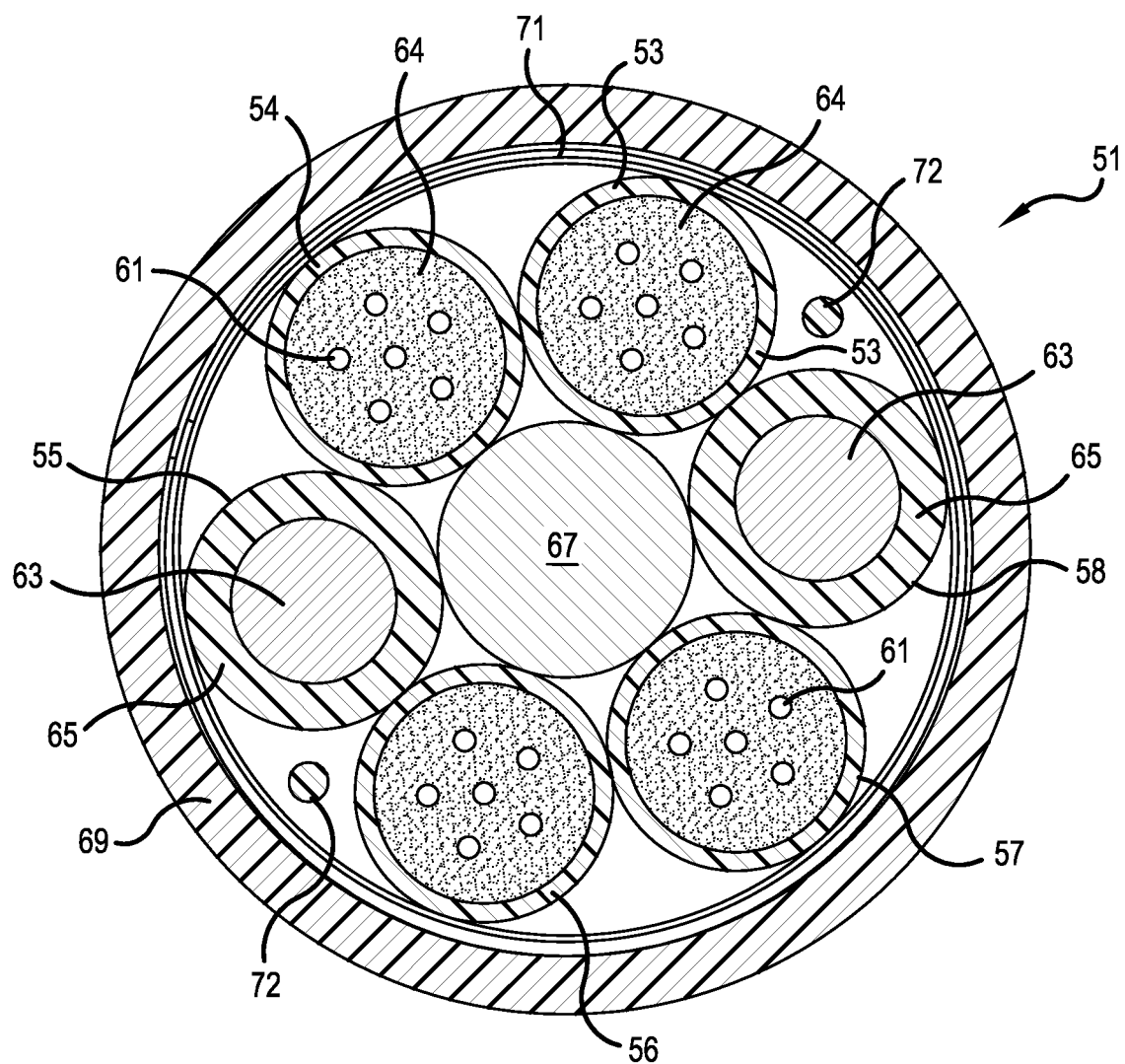
FIG. 6 is a second cross sectional view of the multi-member cable.

In FIG. 6, the adhesive strips 73 are absent. The first, second, third, fourth, fifth and sixth cable elements 53, 54, 55, 56, 57 and 58 directly contact the central strength member 67 and each other, but are not adhered thereto. FIG. 6 also illustrates an optional gel 64 within the buffer tubes for the purposes of water blocking. The gel 64 may also optionally be present in the void areas within the outer jacket 69, e.g., between the first, second, third, fourth, fifth and sixth cable elements 53, 54, 55, 56, 57 and 58 and the central strength member 67.

In practice, the adhesive strips 73 may be of a short length, e.g., such as greater than 1 mm and less than 30 mm, like between 2 mm and 20 mm, or about 10 mm in length.

The adhesive strips 73 are only inserted into the cable core 68 intermittently along a length of the multi-member cable 51 to form adhesion points at spaced intervals along the length of the multi-member cable 51.

Figure 7:
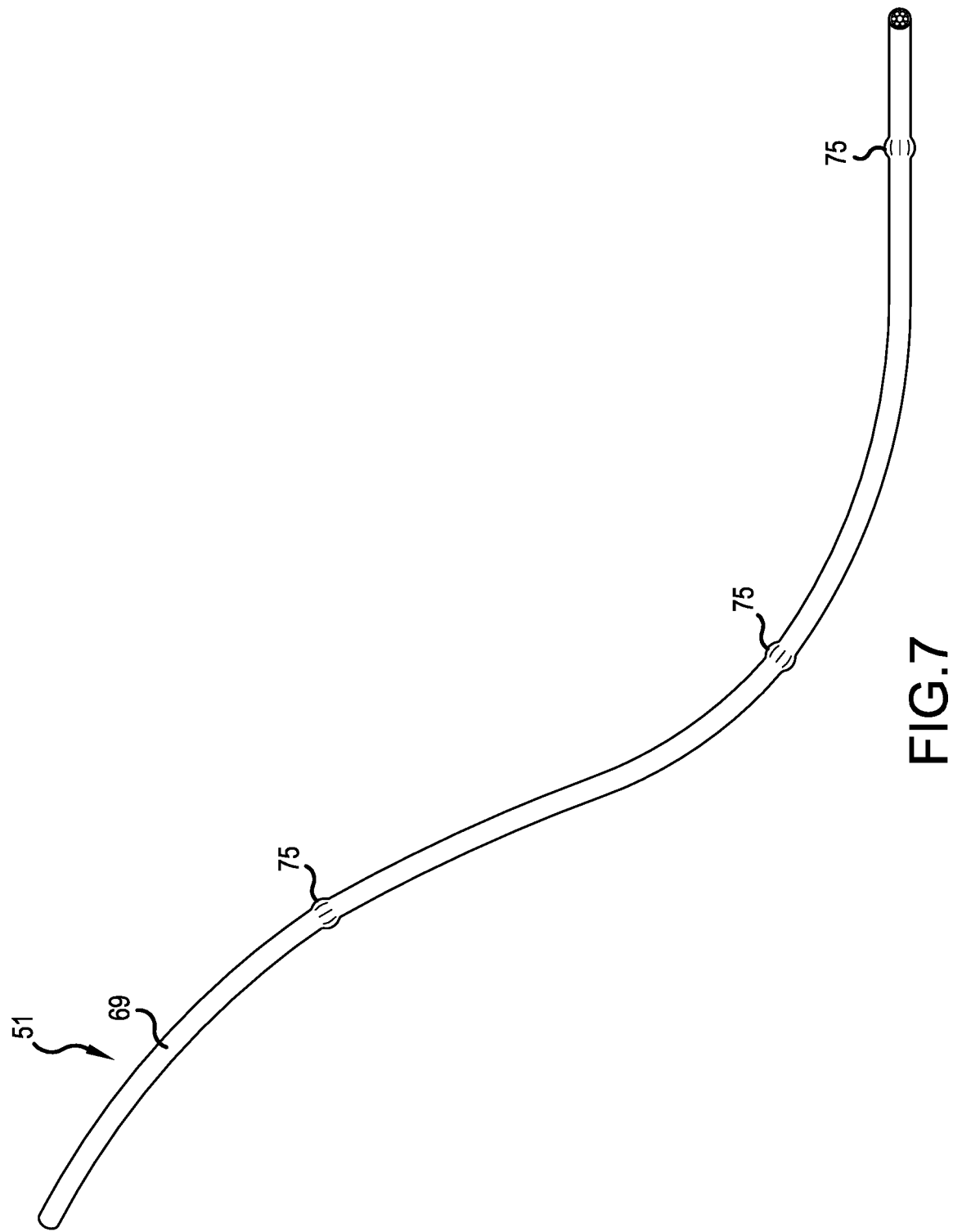
FIG. 7 is a perspective view of the outer jacket of a length of the multi-member cable illustrating bumps on the outer surface.

In a preferred embodiment, the adhesion points are spaced apart at an interval equal to the distance A between the first and second reversal points 27 and 29, which is also equal to the distance B. Further, the adhesion points are formed proximate the first and second reversal points 27 and 29. By forming the adhesion points proximate all of the first and second reversal points 27 and 29, the outer jacket 69 will show indications, like bumps 75 on its outer surface, as best seen in FIG. 7. The bumps 75 are caused by the presence of the segments of the adhesive strip 73 within the cable core 68, which make the cable core 68 larger at the switchbacks, aka, the first and second reversal points 27 and 29. FIG. 7 has exaggerated the size of the bumps 75 for the purposes of illustration. In practice, the bumps 75 may be barely visually perceivable.

The bumps 75 along the multi-member cable 51 may be very advantageous to a technician tasked with performing a mid-span access. The technician can determine the switchback points in the core strand by visual inspection or by the physical feel of the outer jacket 69. For example, the bumps 75 may be barely visible, however the human finger can sense extremely small changes in a surface, such as a human hair resting on a flat table. The technician can simply wrap his fingers around the multi-member cable 51 and slide his hand along the outer jacket 69. As the multi-member cable 51 slides through the technician's hand, he should be able sense the switchbacks of the cable core within the outer cable jacket 69 due to the slight bumps 75 along the outer surface of the outer jacket 69.

By sensing the switchbacks, the drawbacks of the prior art, as discussed above, can be alleviated. The technician will no longer need to be lucky in selecting the locations for the first and second ring cuts in hopes of finding a core strand switchback. Indeed, the entire first cut out section, i.e., the exploratory cut out section to locate a switchback, may be skipped. The technician may proceed to the full cut process, and simply measure the set distances on either side of the located switchback, so as to make only two ring cuts for a mid-span access.

Instead of using intermediately spaced segments of the adhesive strip 73 at the first and second reversal points 27 and 29 to create the bumps 75, it would also be possible to use intermediately spaced segments of an outer wrap 74 only at the first and second reversal points 27 and 29 in accordance with a third embodiment. For example, FIG. 4A is a perspective view of the multi-member cable 51 of FIG. 3, with a large section of the outer jacket 69 removed to show the core strand reversal points 27 and 29, which are covered by intermittently placed, outer wraps 74. The added thickness of the outer wraps 74 to the cable core 68 could be sufficient to cause the perceptible bumps 75 on the outer jacket 69, so that the switchbacks could be located by the technician.

In a modified first embodiment, the adhesion exists along the entire length of the cable core. For example, FIG. 8 may be considered a cross sectional view taken along lines D-D and E-E in FIG. 4.

Figure 8:
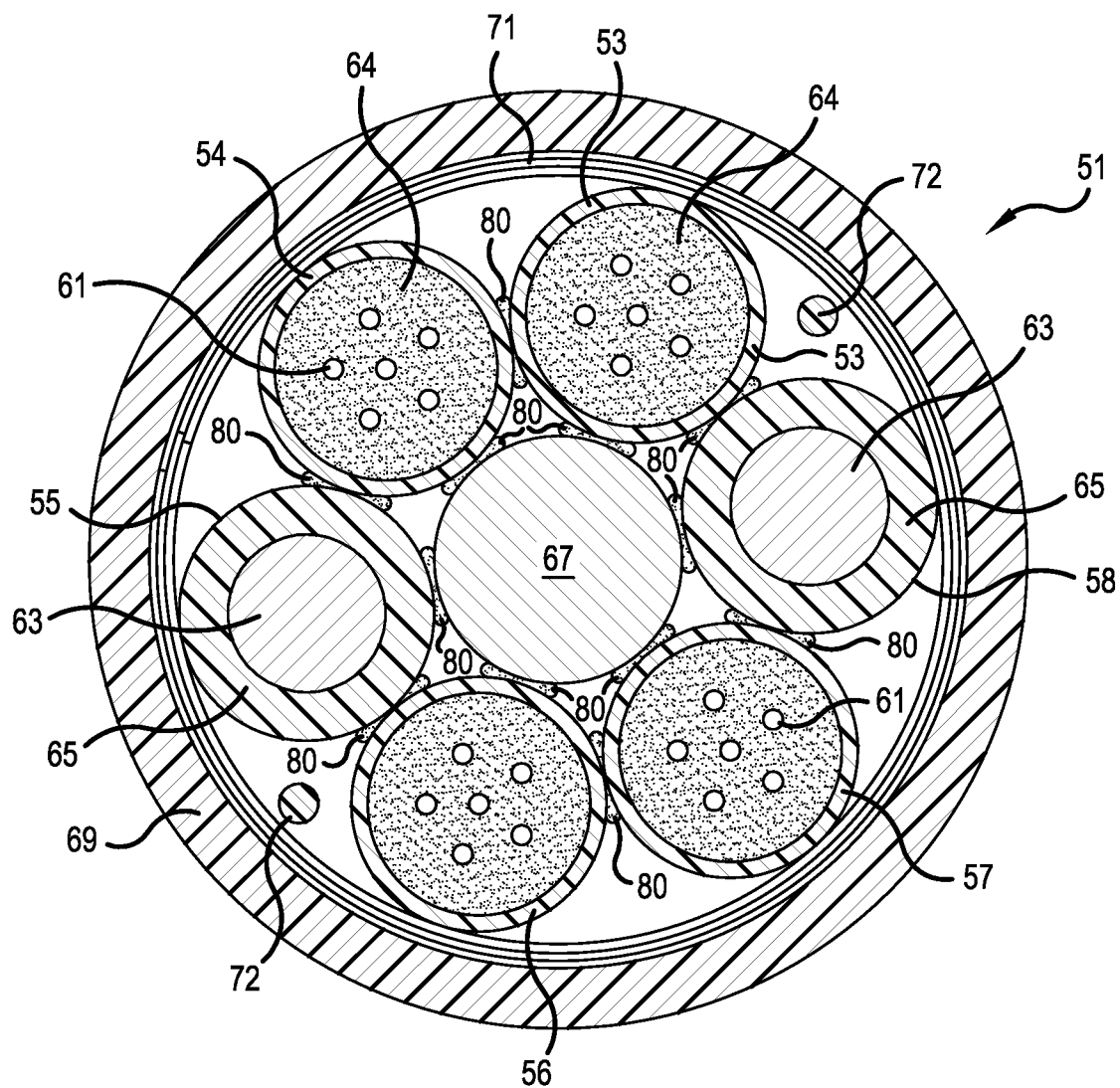
FIG. 8 is a third cross sectional view of the multi-member cable.

In FIG. 8, the first, second, third, fourth, fifth and sixth cable elements 53, 54, 55, 56, 57 and 58, as well as the central strength member 67, are shown in cross section. Two ripcords 72 are also shown in cross section, and are optionally included within the multi-member cable 51. The cable core 68 does not include any adhesive strips 73 (as shown in FIG. 5). Rather the outer surface of the central strength member 67 and the outer surfaces of the first, second, third, fourth, fifth and sixth cable elements 53, 54, 55, 56, 57 and 58, e.g., jackets thereof, may be directly bonded to each other. For example, the outer jackets or skins may be slightly melted together at melt points 80, to an extent sufficient to stick to each other. This may be accomplished by heat, and a heating element or flame may be provided in the manufacturing stream.

More information about direct bonding between jackets in a cable core can be found in U.S. Pat. No. 7,259,332, which is herein incorporated by reference. U.S. Pat. No. 7,259,332 describes a multi-member cable with no outer jacket. Instead of an outer jacket, the members of the cable core are held together by one or more adhesive members or by direct bonding of the jackets.

In an alternative to the second embodiment, the adhesion exists intermittently along the entire length of the cable core. For example, FIG. 8 may be considered a cross sectional view taken along line D-D in FIG. 4, and FIG. 6 may be considered a cross sectional view taken along line E-E in FIG. 4.

In FIG. 6, the bondings 80 between the central strength member 67 and the first, second, third, fourth, fifth and sixth cable elements 53, 54, 55, 56, 57 and 58 are absent. The first, second, third, fourth, fifth and sixth cable elements 53, 54, 55, 56, 57 and 58 directly contact the central strength member 67, but are not adhered thereto. In practice, the melt points 80 may be of a short length, e.g., such as greater than 1 mm but less than 30 mm, like between 2 mm and 20 mm, or about 10 mm in length. The melt points 80 are only formed on the cable core 68 intermittently along a length of the multi-member cable 51 by an intermittent blast of heat to form adhesion points at spaced intervals along the length of the multi-member cable 51.

In a preferred embodiment, the melt points 80 are spaced apart at an interval equal to the distance A between the first and second reversal points 27 and 29, which is also equal to the distance B. Further, the melt points 80 are formed proximate the first and second reversal points 27 and 29. By forming the melt points 80 proximate all of the first and second reversal points 27 and 29, the cable core will not unravel at the core switchback points during the manufacturing process, e.g., prior to the extrusion of the outer jacket 69 onto the cable core 68.

Figure 9:
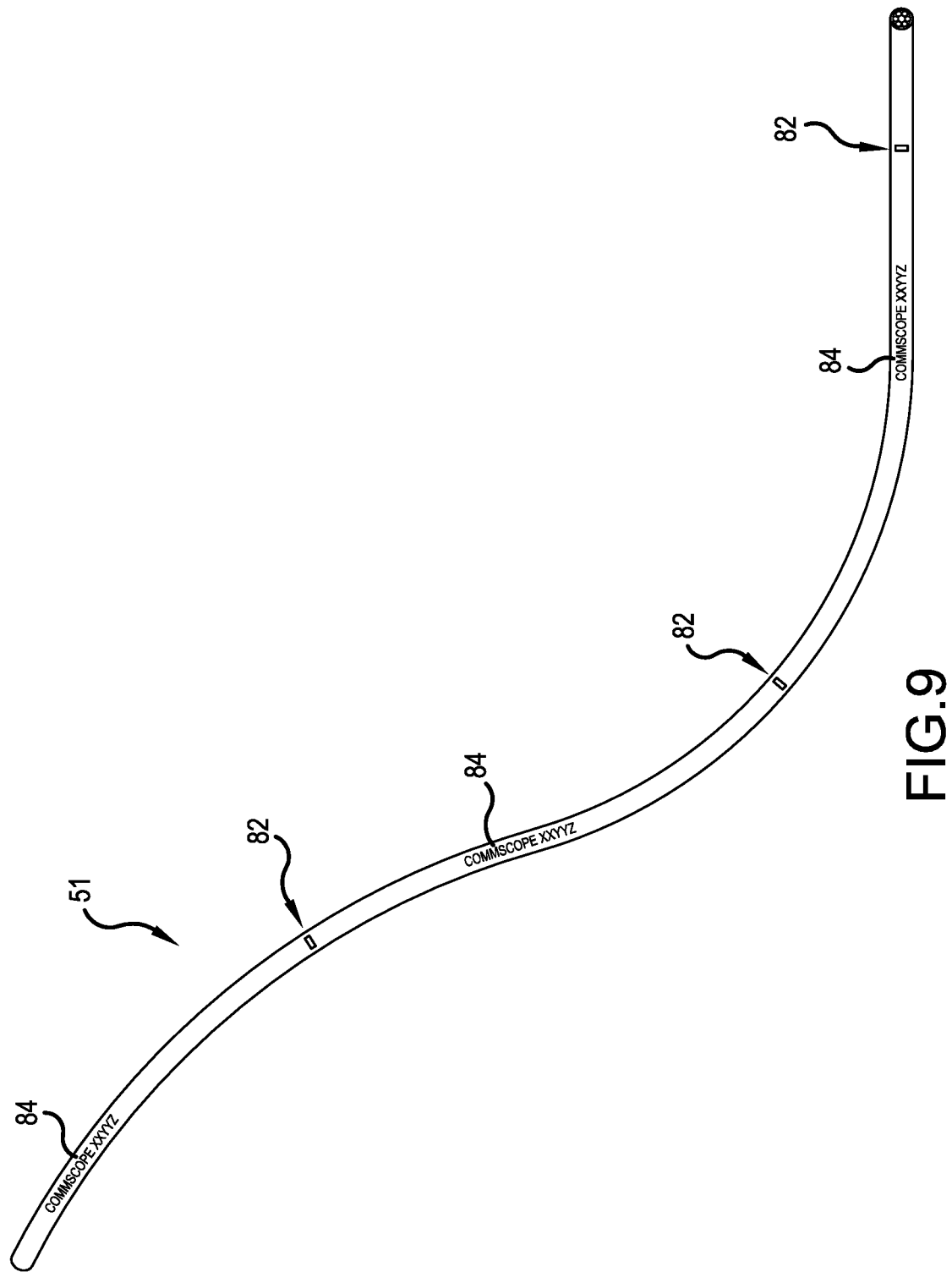
FIG. 9 is a perspective view of the outer jacket of a length of the multi-member cable illustrating switchback identifiers on the outer surface.

It is unlikely that the melting points 80 will cause indications, like perceivable bumps 75, on the outer surface of the jacket 69. Therefore, indications in the form of indicia 82 may be printed or etched into the outer surface of the outer jacket 69, as best seen in FIG. 9. The indicia 82 may be located at each first reversal point 27 along the length of the multi-member cable 51 or at each second reversal point 29 along the length of the multi-member cable 51. Preferably, the indicia 82 are located at all of the first and second reversal points 27 and 29 along the length of the multi-member cable 51. The indicia 82 may be printed/etched on the outer surface of the outer jacket 69 by the same manufacturing equipment which is already printing other indicia 84 on the outer surface of the multi-member cable 51, like the manufacturer's identification, cable part number, manufacture date, length markers, etc.

Like the bumps 75 of FIG. 7, the indicia 82 may be very advantageous to a technician tasked with performing a mid-span access. The technician can determine the switchback points in the core strand by visual inspection of the outer jacket 69. By knowing the locations of the switchbacks, the drawbacks of the prior art, as discussed above, can be alleviated. The technician will no longer need to be lucky in selecting the locations for the first and second ring cuts in hopes of finding a core strand switchback. Indeed, the entire first cut out section, i.e., the exploratory cut out section to locate a switchback, may be skipped. The technician may proceed to the full cut process, and simply measure the set distances on either side of the selected switchback indicia 82, so as to make only two ring cuts for a mid-span access.

Figure 10:
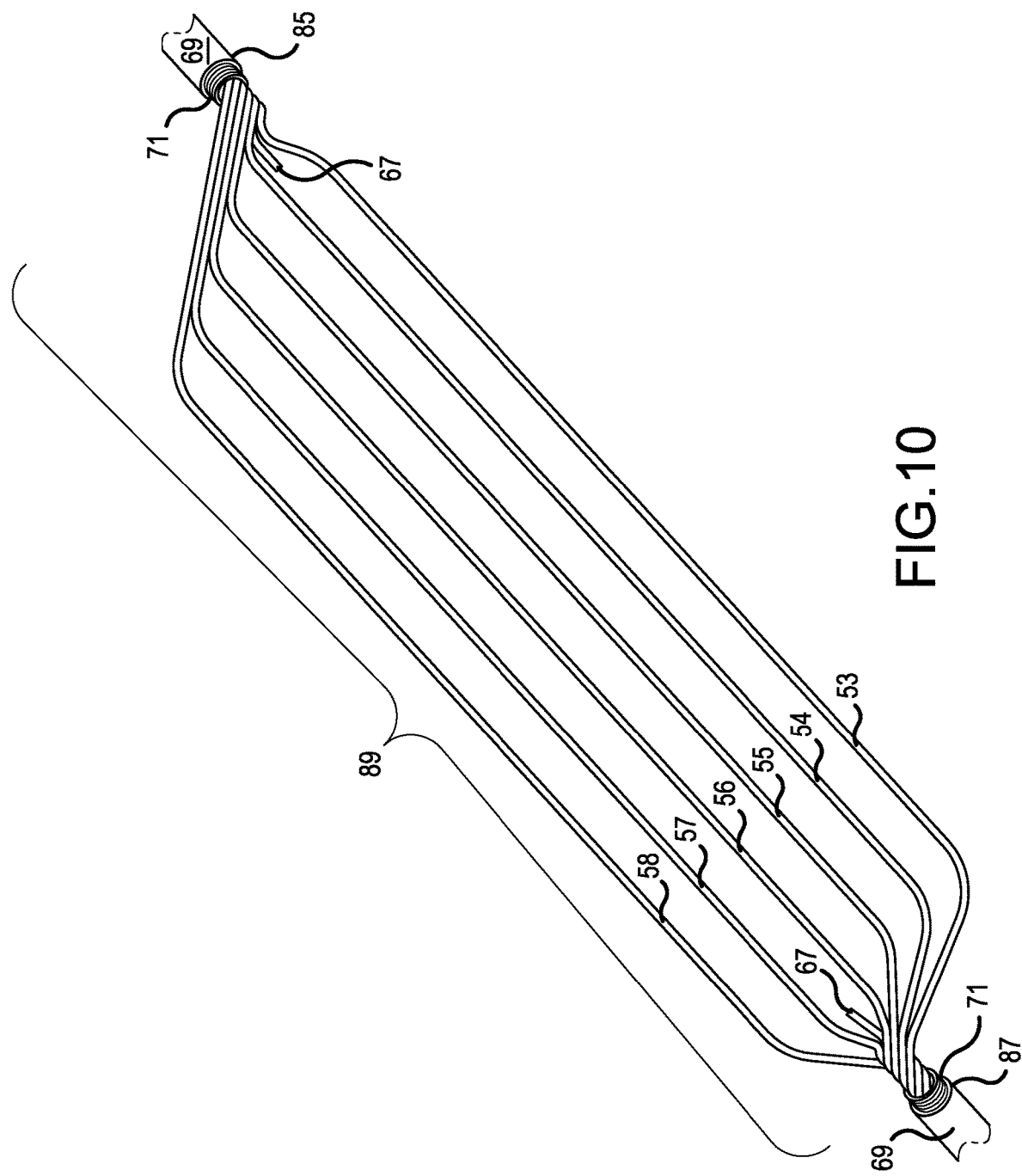
FIG. 10 is a perspective view of a multi-member cable in accordance with the embodiments of the present invention, after ring cuts have been made, the outer jacket has been removed, the cable core has been exposed, and the cable elements have been spread apart.

As best seen in FIG. 10, a first ring cut 85 and a second ring cut 87 have been made to the outer jacket 69. The armor layer 71 has been removed from the cable core 68 over a section 89. The central strength member 67 has been cut proximate the first ring cut 85 and proximate the second ring cut 87 and the removed section of the central strength member 67 has been discarded. The cable core 68 has been unwound at one or more of the first and/or second reversal points 27 and 29, and the first, second, third, fourth, fifth and sixth cable elements 53, 54, 55, 56, 57 and 58 have been spread apart. The multi-member cable 51 is now ready to perform a mid-span access operation.

Regardless of the adhesion process performed above, the binding tapes 35 and 37 (in FIGS. 1 and 2) are no longer needed in the cable core. Therefore, the cost of the binding tapes 35 and 37 is spared in the manufacturing process. Also, the technician no longer needs to cut off the binding tapes 35 and 37. This reduced step saves time, and also reduces the risk of physical injury to the technician and damage to the cable elements 53, 54, 55, 56, 57 and 58 of the multi-member cable 51.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A multi-member cable comprising:
   a central strength member approximately centered on a center axis of said multi-member cable;
   a first cable element;
   a second cable element;
   a third cable element;
   a fourth cable element, wherein said first, second, third and fourth cable elements twist around said central strength member three hundred sixty degrees in the counterclockwise direction multiple times to said first reversal point, then said first, second, third and fourth cable elements twist around said central strength member three hundred sixty degrees in a clockwise direction multiple times until said second reversal point, and wherein said first, second, third and fourth cable elements repeat the pattern of counterclockwise and clockwise twists about said central strength member between multiple first and second reversal points along a length of said multi-member cable;
   a coupling formed between said first and second cable elements along the length of said multi-member cable, wherein said coupling is constant between said first and second cable elements along the length of said multi-member cable; and
   an outer jacket formed over said central strength member and said first, second, third and fourth cable elements, wherein an outer surface of said first cable element is directly melted to an outer surface of said second cable element to form said coupling without any adhesive.

2. The multi-member cable according to claim 1, wherein an outer surface of said outer jacket includes indications at said first and second reversal points.

3. The multi-member cable according to claim 2, wherein said indications are printed or etched into said outer surface of said outer jacket.

4. The multi-member cable according to claim 1, wherein said first cable element is a first buffer tube with one or more optical fibers therein; and wherein said second cable element is a second buffer tube with one or more optical fibers therein.

5. The multi-member cable according to claim 1, wherein said first and second cable elements are also coupled to each other via adhesion points to said central strength member.

6. A multi-member cable comprising:
a central strength member approximately centered on a center axis of said multi-member cable;
a first cable element;
a second cable element
a third cable element; and
a fourth cable element, wherein said first, second, third and fourth cable elements twist around said central strength member three hundred sixty degrees in the counterclockwise direction multiple times to said first reversal point, then said first, second, third and fourth cable elements twist around said central strength member three hundred sixty degrees in a clockwise direction multiple times until said second reversal point, and wherein said first, second, third and fourth cable elements repeat the pattern of counterclockwise and clockwise twists about said central strength member between multiple first and second reversal points along a length of said multi-member cable
a first coupling constantly formed between said first cable element and said central strength member along the length of said multi-member cable, wherein an outer surface of said first cable element is directly melted to an outer surface of said central strength member to form said first coupling without any adhesive;
a second coupling constantly formed between said second cable element and said central strength member along the length of said multi-member cable, wherein an outer surface of said second cable element is directly melted to said outer surface of said central strength member to form said second coupling without any adhesive; and
an outer jacket formed over said central strength member and said first, second, third and fourth cable elements.

7. The multi-member cable according to claim 6, wherein an outer surface of said outer jacket includes indications at said first and second reversal points.

8. The multi-member cable according to claim 7, wherein said indications are printed or etched into said outer surface of said outer jacket.

9. The multi-member cable according to claim 6, wherein said first cable element is a first buffer tube with one or more optical fibers therein; and wherein said second cable element is a second buffer tube with one or more optical fibers therein.

* * * * *